United States Patent
Haas, Sen. et al.

(10) Patent No.: US 6,254,916 B1
(45) Date of Patent: Jul. 3, 2001

(54) METHOD AND DEVICE FOR PRODUCING EDIBLE WAFER ROLLS

(75) Inventors: Franz Haas, Sen., Vienna; Johann Haas, Klosterneuburg; Stefan Jiraschek, Vienna, all of (AT)

(73) Assignee: Franz Haas Waffelmaschinen-Industrie Aktiengesellschaft, Vienna (AT)

( * ) Notice: Subject to any disclaimer, the term of this patent is extended or adjusted under 35 U.S.C. 154(b) by 0 days.

(21) Appl. No.: 09/284,149

(22) PCT Filed: Dec. 12, 1997

(86) PCT No.: PCT/AT97/00275

§ 371 Date: Apr. 7, 1999

§ 102(e) Date: Apr. 7, 1999

(87) PCT Pub. No.: WO98/25474

PCT Pub. Date: Jun. 18, 1998

(30) Foreign Application Priority Data

Dec. 13, 1996 (AT) .................................................. A2182/96

(51) Int. Cl.[7] ................... A23L 1/00; A21B 5/02; A21C 15/02; A23P 1/00
(52) U.S. Cl. ................ 426/523; 426/501; 426/514; 99/353; 99/450.1; 99/450.2; 425/335; 425/363
(58) Field of Search ..................... 426/500, 501, 426/514, 523; 99/450.1, 450.2, 353; 425/335, 363, 471, 305.1

(56) References Cited

U.S. PATENT DOCUMENTS

| | | | | |
|---|---|---|---|---|
| 1,147,491 | * | 7/1915 | Embrey | 425/139 |
| 2,170,405 | * | 8/1939 | Greenwood | 165/90 |
| 2,323,907 | * | 7/1943 | Harriss et al. | 425/335 |
| 3,792,954 | | 2/1974 | Heyman | 425/391 |
| 4,241,648 | * | 12/1980 | Longenecker | 99/349 |

FOREIGN PATENT DOCUMENTS

| | | |
|---|---|---|
| 262 187 | 6/1968 | (AT) . |
| 314 960 | 5/1974 | (AT) . |
| 2 413 353 | 10/1974 | (DE) . |
| 0 272 341 A1 | 6/1988 | (EP) . |
| 2 272 611 2 | 12/1975 | (FR) . |

* cited by examiner

*Primary Examiner*—Milton Cano
*Assistant Examiner*—Robert Madsen
(74) *Attorney, Agent, or Firm*—Herbert Dubno

(57) ABSTRACT

Edible wafer rolls are produced by baking an endless plastically deformable wafer strip from a flowable sugar containing wafer dough, directing the wafer strip continuously from the hot endless revolving baking surface onto a continuously rotating mandrel juxtaposed with a counter rotating winding roller, grasping the leading portion of the strip and pulling it around the mandrel toward a following wafer strip portion. The wafer is wound in helically overlapping turns to form the hollow wafer body which is cutting into wafer rolls of a predetermined length.

16 Claims, 7 Drawing Sheets

METHOD AND DEVICE FOR PRODUCING EDIBLE WAFER ROLLS

CROSS REFERENCE TO RELATED APPLICATIONS

This is a national stage of PCT/AT97/00275 filed Dec. 12, 1997 based upon Austrian national application A2182/96 filed Dec. 13 1996 under the International Convention.

TECHNICAL FIELD

The invention relates to the production of edible, crunchy and brittle wafer rolls made of endless wafer strips plastically deformable when hot, which are wound over a mandrel into an endless, tubular hollow body and are then cut into separate measured wafer rolls, which assume a crunchy, brittle consistency while cooling.

STATE OF THE ART

When producing wafer rolls, a fluid sugar-containing wafer dough is continuously baked in a baking machine on a hot revolving baking surface which rotates continuously in the same direction about a horizontal axis into an endless wafer strip which is plastically deformable when hot and which adheres with its bottom side to the hot baking surface. The baked wafer strip is removed from the baking surface in the direction of its run, at a predetermined removal level and is wound helically overlapping in a lower-lying winding device into an endless, plastically deformable tubular hollow body, from which the individual wafer roll are separated, which during cooling assume their typical crunchy and brittle consistency. The baked wafer strip is removed from the passing baking surface by a horizontal removal blade arranged perpendicularly to the running direction of the baking surface.

The removed wafer strip is wound in a winding device arranged obliquely with respect to its path or travel direction is as known from Austrian Patent 314 960, in a helically overlapping manner, into an endless, plastically deformable tubular hollow body. This winding device provides two winding members rotating in opposite directions about mutually parallel rotation axes, which between them form a winding gap. One winding member is a mandrel about which the wafer strip is wound helically overlapping, forming a tubular hollow body. The other winding member is a roller which obliquely feeds the baked wafer strip to the mandrel or the winding gap and which during winding presses the wafer strip against the mandrel or against the forming hollow body. At its periphery the roller has a transport threading by means of which the tubular hollow body is moved in its longitudinal direction together with the rotating mandrel. The inclined position of the winding gap with respect to the travel direction of the wafer strip, on the one hand, and the rotational speed of the roller provided with the threading, on the other hand, determine the degree of the mutual overlapping of the individual turns of the wafer strip during the winding of the tubular hollow body and thereby the number of the wafer strip layers lying on top of one another, or the thickness of the tubular hollow body formed by the overlapping wafer strip layers.

Depending on the baking machine for the production of the endless wafer strip, the wafer dough is either poured onto an upwards facing hot revolving baking surface, or supplied to the hot revolving baking surface at a downwards facing part by means of a guide plate, whose upper part drops off towards the baking surface and forms together with the latter a wedge-shaped gap filled with wafer dough and from which the wafer dough is continuously drawn off by the hot revolving baking surface. In both cases on the hot baking surface an endless strip of wafer dough is formed, which adheres with its bottom side to the baking surface, and during the revolution of the baking surface is baked into a plastically deformable wafer strip.

Different parameters are involved in setting the width and the thickness of the wafer strip, depending on the baking machine. One parameter is the surface configuration of the revolving baking surface, which can be totally smooth or provided with a single depression receiving the dough strip. Another parameter is the viscosity of the fluid wafer dough, mainly prepared from flour, sugar and water, whose viscosity is varied mainly through the proportion of water. A further parameter is the manner in which the flowable wafer dough is applied to the baking surface. When the application takes place via a guide plate, the wedge-shaped gap between the baking surface and the guide plate and the lateral margins of the guide plate can be involved in controlling the width and the thickness of the baked wafer strip. When the dough is directly poured onto the revolving baking surface, one or more spray jets directed towards the baking surface can be used. The width and thickness of the baked wafer strip can be influenced by the width of a single stationary spray jet, or by the spatial arrangement of several stationary spray jets along the baking surface, or by the motion of one or more spray jets with respect to the baking surface.

In order to be able to start the production of the wafer rolls, first a flowable dough is applied to the hot revolving baking surface, which has already been heated to a baking temperature between 130 and 220 degrees Celsius, to form a dough strip which during the revolution of the baking surface is baked into a plastically deformable wafer strip, whereby the initial strip portion reaches the stationary removal blade and over that is allowed to fall to a lower level, until the formed initial portion of the baked wafer strip is long enough to be manually seized by an operator. The long initial portion of the dough strip is then manually wrapped once about the rotating mandrel and introduced into the winding gap of the winding device. This procedure is executed by the operator very quickly and with protective gloves, in order to avoid injury due to a possible contact with the very hot parts of the baking machine, such as the baking surface or the removal blade or the hot parts of the winding device, such as the rotating mandrel or the roller rotating in the opposite direction.

In the known baking devices, all around the revolving baking surface or between the revolving baking surface and the winding device, sufficient space is available to allow for the initial portion of the baked wafer strip to be seized by hand and wrapped about the rotating mandrel. However the problem of handling a hot wafer strip in a space surrounded by hot, rapidly rolling parts is still there.

In order to increase the output of the baking machine for the continuous production of edible wafer rolls, on the outer shell surface of a heated baking drum rotating about a horizontal rotation axis up to six wafer strips are simultaneously baked next to each other, and then wound helically overlapping, in six winding devices arranged next to one another, into six endless tubular hollow bodies, each of which is separated into wafer rolls. In these baking machines, only very little room is left between the winding devices with their rapidly rotating winding members or between the winding devices and the hot rotating baking drum, in order to allow for each baked wafer strip to be seized by hand and wrapped around the rotating mandrel of the respective winding device.

OBJECT OF THE INVENTION

It is the object of the invention to provide a method of and an apparatus for the production of edible wafer rolls whereby the handling of the hot wafer strip in a space surrounded by hot parts is eliminated.

SUMMARY OF THE INVENTION

In order to achieve this object, a method for the continuous production of edible wafer rolls is proposed, whereby on an endlessly revolving baking surface, from a flowable, sugar-containing wafer dough an endless wafer strip is continuously baked, which is plastically deformable when hot, and which is removed from the hot baking surface at a predetermined removal level over a downwardly sloping removal blade, and below the removal level, in a winding gap obliquely arranged with respect to the path of the wafer strip, between two winding members rotating in opposite directions, is wound in a helically overlapping manner around a winding member designed as a mandrel, to form an endless tubular hollow body. The latter is separated into individual wafer rolls with a measured length, which during cooling assume a crunchy, brittle consistency.

According to the invention at the start of each winding process the initial portion of the baked wafer strip is allowed to fall due to gravity, from the removal level over the removal blade onto the winding members forming the winding gap, and then is drawn into the winding gap by at least one of the two winding members forming the winding gap and the initial portion of the wafer strip is guided back to the wafer strip entering the winding gap, either by adhering to the winding organ designed as a mandrel or due to plastic deformation of the wafer strip.

According to the invention, the heretofore manually performed insertion of the initial portion of the wafer strip into the winding device is replaced by an automatic process, wherein the handling by an operator, in the immediate vicinity of the hot parts of a baking machine rotating in opposite directions, is no longer required.

According to a further feature of the invention, the initial portion of the wafer strip, entering the winding gap on the one side and exiting the winding gap on the other side, can be guided within a stationary annular guide channel around the winding member represented by a mandrel until it hits against the wafer strip entering the winding gap.
This return motion of the initial portion of the wafer strip which has already passed once through the winding gap leads then also to the automatic start of the winding process, even when the initial portion of the wafer strip has not wrapped itself immediately around the mandrel.

Further the invention provides a baking machine for the continuous production of edible wafer rolls. This baking machine is provided with at least one continuously revolving heated baking surface, on which at least one endless wafer strip of flowable sugar-containing wafer dough, plastically deformable when hot, is baked. This baking machine further comprises a processing station, wherein for each baked wafer strip a removal device close to the baking surface and a winding device arranged downstream thereof for the production of an endless tubular hollow body, and a cutting device arranged downstream of the winding device, for the cutting of the tubular hollow body into individual wafer rolls of measured lengths. Each winding device has a winding gap arranged obliquely with respect to the path of the respective baked wafer strip, and formed between two winding members rotating in opposite directions, one of which is a mandrel around which the baked wafer strip is wound helically overlapping into an endless tubular hollow body, and the other is a roller which presses the baked wafer strip against the rotating mandrel. According to the invention, this baking machine is characterized in that each winding device has an insertion device, which automatically introduces the initial portion of the baked wafer strip into the winding gap of the respective winding machine.

Further the invention provides a winding device for the production of an endless tubular hollow body from a baked endless wafer strip which is plastically deformable when hot. This winding device is provided with two winding members rotating in opposite directions and forming a winding gap, one of which is a mandrel around which the baked wafer strip is wound helically overlapping into an endless tubular hollow body, and the second one is a roller, which presses the baked wafer strip against the rotating mandrel. According to the invention, this winding device is characterized in that it is equipped with a device, which automatically inserts the initial portion of the baked wafer strip into the winding gap defined between the mandrel and the roller.

According to a further feature of the invention, for the first-time insertion of the initial portion of the wafer strip into the winding gap, the insertion device can comprise a threading member preceding the winding gap which has a guide surface dropping off towards the winding gap.

According to yet another feature of the invention, for the repeated insertion of the initial portion of the wafer strip exiting the winding gap, the insertion device can comprise at least one threading member arranged downstream of the winding gap, which outwardly borders a guide channel, which surrounds the winding mandrel in the sector between the winding member designed as a roller and the wafer strip entering the winding gap.

According to a further feature of the invention, the threading member bordering the guide channel on the outside can be a cylindrical guide surface facing the mandrel.

According to a further feature of the invention, the guide channel can be formed on the outside by a roller parallel to the mandrel and rotating in the opposite direction from the mandrel.

According to another feature of the invention, the guide channel can be bordered on the outside by several rollers arranged in an arc around the mandrel, which are parallel to the mandrel and rotate in the opposite direction from the mandrel.

According to another feature of the invention, the guide channel can be bordered on the outside by a cylindrical guide surface facing the mandrel.

According to a further feature of the invention, at its border next to the roller, the cylindrical guide surface can be built as a scraper blade cooperating with the roller for the initial portion of the wafer strip.

The invention is subsequently closer described with the aid of the drawing representing several embodiments.

BRIEF DESCRIPTION OF THE DRAWING

The drawing shows:

FIG. 1*b* shows a top view of the winding device taken along line A—A in FIG. 1*a*.

SPECIFIC DESCRIPTION

Figure 1:
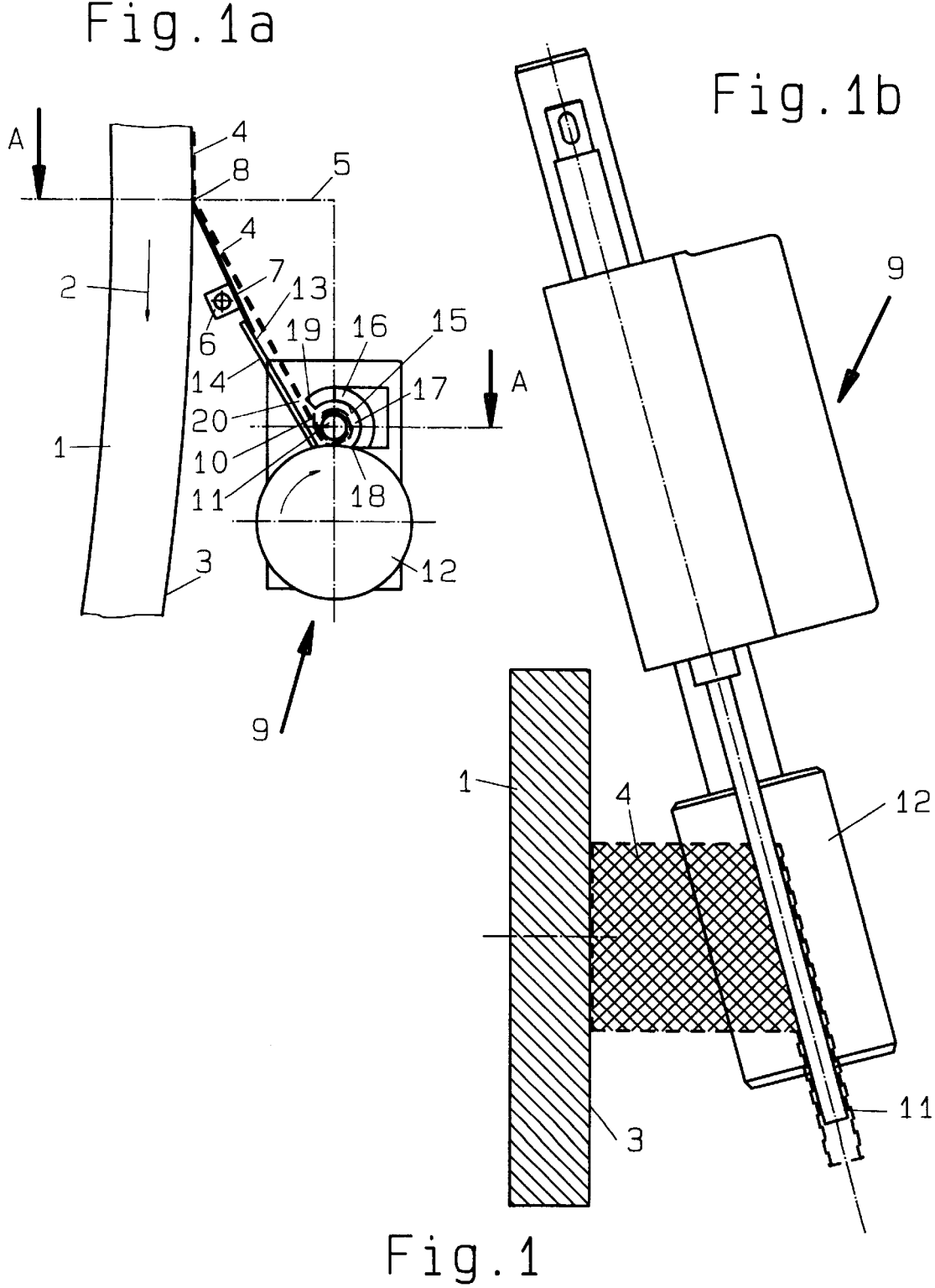
FIG. 1 shows schematically a part of a processing station of a baking machine for the continuous production of edible wafer rolls, with a first embodiment of a winding device comprising a first embodiment of the insertion device for the automatic insertion of the initial portion of the wafer strip in the winding gap of the winding device, whereby FIG. 1*a* schematically shows a section of the revolving baking surface with the neighboring winding device in a side view

In FIG. 1a and FIG. 1b a part of a baking machine for the continuous production of edible wafer rolls is represented, wherein a heated cylindrical baking drum continuously revolves around a horizontal axis of rotation. In FIG. 1a the rotation axis of the baking drum lies perpendicularly to the drawing plane and in FIG. 1b it lies parallel to the drawing plane.

The outside of the cylindrical shell 1 of the baking drum revolving in FIG. 1a in the direction of arrow 2 is an endless baking surface 3, onto which a fluid sugar-containing wafer dough is continuously applied, forming on the baking surface 3 an endless dough strip, which revolves together with the baking drum in the running direction 2 and which is baked during this revolution. The wafer strip 4 adhering on the hot baking surface 3 with its bottom side and plastically deformable while hot, is removed in the lateral area of the drum apex, on a predetermined removal level 5. A removal blade 7, pivotable about an axis 6 parallel to the rotation axis of the baking drum, lies above its pivot axis 6 with its upper edge 8 on the removal level 5 against the revolving baking surface 3. The removal blade 7 extends obliquely downward from its upper edge 8 over its pivot axis 6.

Below the removal level 5 a winding device 9 is arranged, wherein the baked wafer strip 4, by passing through a winding gap 10 obliquely arranged with respect to its travel direction, is continuously wound helically in overlapping turns to form a tubular hollow body. The winding gap 10 is limited upwards by a mandrel 11 rotating about a horizontal rotation axis, and downwards by a roller 12, which rotates about a horizontal rotation axis parallel to the mandrel 11 and in the opposite direction from mandrel 11. The roller 12, which is of substantially larger diameter than the mandrel 11, rotates in the same direction as the baking drum and is provided on the outside with a threading not shown in the drawing. During winding, the baked wafer strip 4 is pressed with its upper side by the rotating roller 12 resting against its underside towards the rotating mandrel 11 and by the action of the threading of the roller 12 is pushed ahead in the longitudinal direction of the mandrel 11. The wafer strip 4 is wound helically in overlapping turns around the mandrel 11 to form a tubular hollow body, which is entrained by friction or on its inner side by the mandrel 11 and on its outer side by the roller 12, and is continuously pushed ahead in the longitudinal direction of the mandrel 11 by the winding process itself.

The angle at which the winding gap 10 or the winding members 11 and 12 parallel thereto, are inclined with respect to the travel direction of the wafer strip 4, determines substantially the extent to which the individual turns of the wound wafer strip overlap each other, and thereby the number of the overlapping strip turns, which form the thickness of the tubular hollow body from which the wafer rolls are made. The winding device 9 comprises further a stationary insertion device for the initial portion of the wafer strip, which at the start of each winding process supports the winding of the initial portion of the baked wafer strip 4 around the mandrel 11. The insertion device has a guide surface 13 arranged upstream of the winding gap 10, sloping downward from the removal blade 7 to the winding gap 10, and which is wider than the baked wafer strip 4. The guide surface 13 is arranged on top of a guide plate 14, which extends from the lower edge of the removal blade 7 obliquely downwards, passing by the mandrel 11 until it reaches the surface of the roller 12. The guide surface 13 or the guide plate 14, forms an insertion member arranged upstream of the winding gap 10.

In the starting phase of the production of wafer rolls, the initial portion of the baked wafer strip 4 adhering to the revolving baking surface 3 is removed from the baking surface 3 by the stationary removal blade 7, and falls due to gravity over the removal blade 7, first onto the downwards sloping guide surface 13 of the insertion device and then continues downwards along this surface bypassing the mandrel 11 onto the surface of the roller 12. By friction the rotating roller 12 entrains the initial portion of the wafer strip, which fell down on its surface in its rotation direction towards the winding gap 10, and presses it against the oppositely rotating mandrel 11, which also by friction entrains the initial portion of the wafer strip in the direction of its rotation. In order to increase the friction, the mandrel 11 can be provided on its outside with axial longitudinal strips. The wafer strip 4 following its initial portion is pressed by the roller 12 against the mandrel 11 and adheres to the mandrel 11. Before a full rotation of the mandrel 11 has been completed, the initial portion of the wafer strip hits the upper side of the wafer strip 4 entering the winding gap 10. This is pressed by the roller 12 against the mandrel 11 or against the initial portion of the wafer strip entrained by friction. This completes the insertion process and the production of the tubular hollow body starts. During the further winding of the wafer strip 4, the segment of the wafer strip 4 extending from the upper edge of the removal blade 7 to the winding gap 10 is stretched due to the winding process and lifted from the removal blade 7 and the guide surface 13.

In order to support the formation of the first strip turn, or the first strip coil about the rotating mandrel 11, as well as frictional entrainment of the initial portion of the wafer strip by the rotating mandrel 11 during the insertion process, one or more thread formations can be provided downstream of the winding gap 10, around the mandrel 11.

FIG. 1a shows a stationary threading member arranged downwards of the winding gap 10, which is designed like a cylindrical guide surface 15 facing the mandrel 11, whose diameter is clearly bigger than the outer diameter of the wafer roll to be produced by the winding device. The cylindrical guide surface 15 is arranged on the inside of guide plate 16 curved coaxially with the mandrel 11, which extends over an arc of approximately 175 angular degrees around the mandrel 11 and defines outwardly an annular guide channel 17 surrounding the mandrel 11.

The guide plate 16 has a longitudinal margin 18 close to the surface of the roller 12, which acting together with the roller 12 constitutes a stripping blade. If the initial portion of the baked wafer strip hangs on the surface of the roller 12, then it is removed from the roller 12 by the stripping blade. Further the guide plate 16 has a longitudinal margin 19, which is arranged close to the guide surface 13 upstream of the winding gap, and together with this guide surface forms a longitudinal slot 20, through which the baked wafer strip 4 enters the insertion device and reaches the winding gap 10 of the winding device 9 located inside the insertion device.

If the initial portion of the wafer strip, after passing through the winding gap 10 is deflected from the mandrel 11, then it enters the annular guide channel 17. Here the initial portion of the wafer strip is pushed forward against the cylindrical guide surface 15 and along the same around the mandrel 11, by the following wafer strip 4 advanced by the winding members 11, 12 rotating in opposite directions. When the initial portion of the wafer strip encounters the wafer strip 4 entering the insertion device through the longitudinal slot 20, it is frictionally entrained by the wafer strip at the upper surface of the same in the rotation direction of the mandrel 11 and reinserted in the winding gap 10 between the wafer strip 4 and the mandrel 11. There the roller 12 presses the wafer strip 4 from the outside against the initial portion of the wafer strip, and the latter against the mandrel 11. Thereby in this case also the insertion operation is completed and the production of the tubular hollow body starts.

Figure 2:
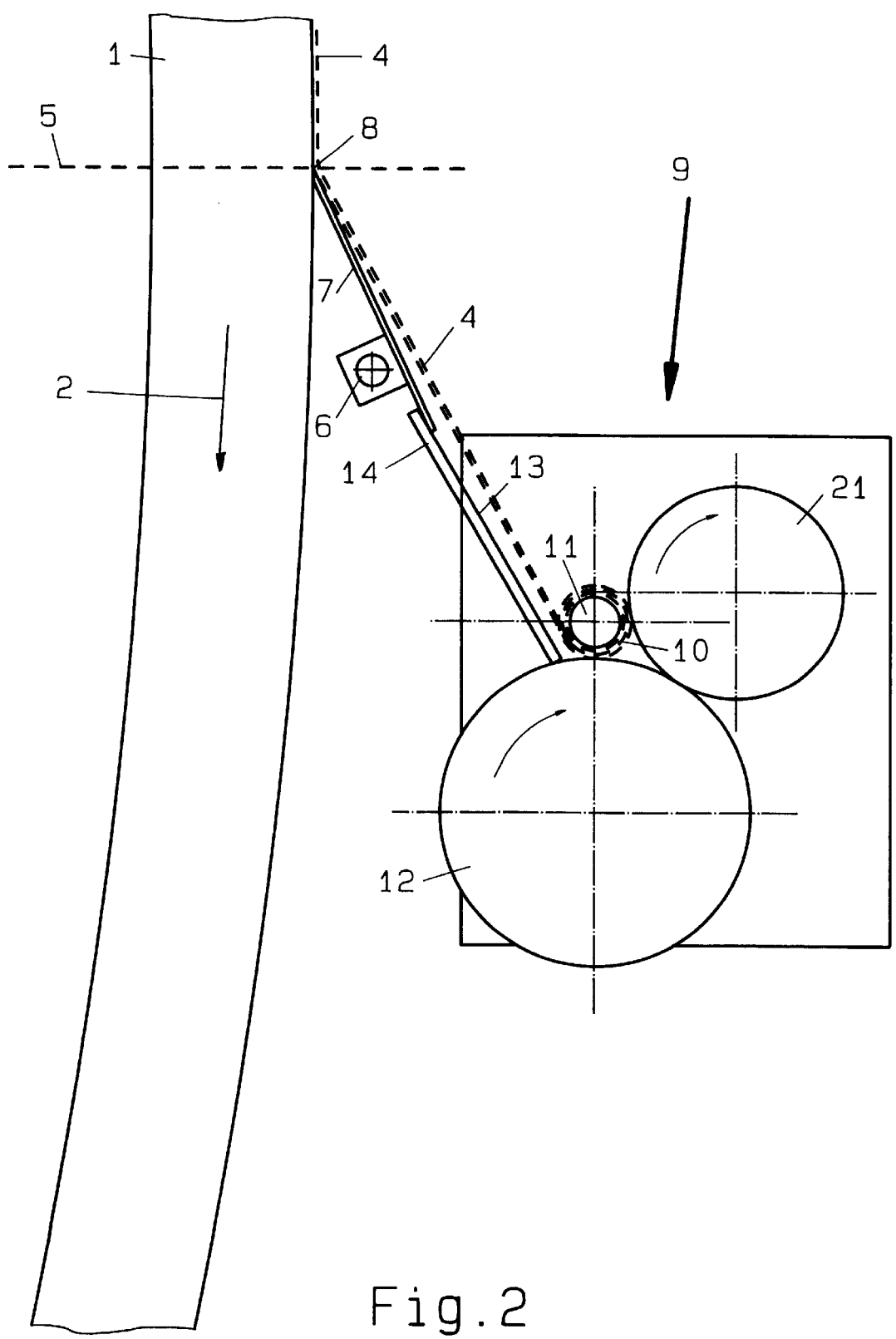
FIG. 2 is a schematic side view of a winding machine corresponding to FIG. 1a, with a second embodiment of the insertion device.

FIG. 2 shows a winding device 9', which corresponds to the one in FIG. 1 except for its threading member. The insertion device of this winding device 9' provides a threading member arranged downstream of the winding gap 10, which is a rotating roller 21, whose distance from the mandrel 11 is greater than distance one to the roller 12. The threading roller 21 rotates in the opposite direction from the mandrel 11 and in the same direction as the roller 12. If the initial portion of the wafer strip 4 moves away from the mandrel 11 after passing through the winding gap 10, then it comes into contact with the roller 21 and is frictionally entrained by the same in the rotation direction of the mandrel 11 and is directed towards the mandrel 11.

Figure 3:
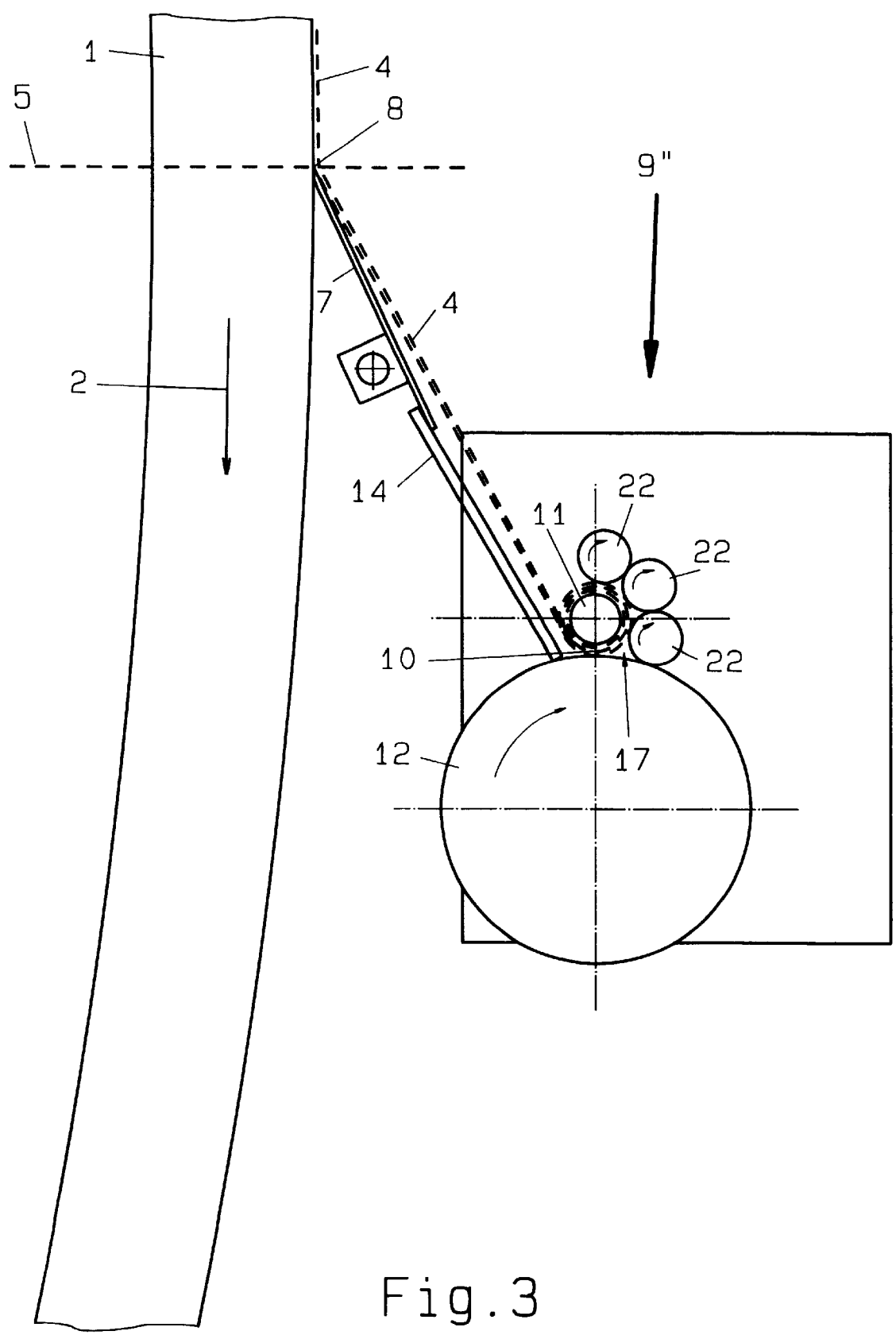
FIG. 3 is a schematic side view of a winding device according to FIG. 1a with a third embodiment of the insertion device.

FIG. 3 shows a winding device 9" which in part corresponds to that of FIG. 1 or FIG. 2. The insertion device of this winding device 9" provides three threading members arranged at a distance from each other downstream of the winding gap 10, all around the mandrel 11. These threading members are rollers 22, which rotate in the opposite direction from the mandrel 11 and in the same direction as the roller 12. If the initial portion of the wafer strip 4 moves away from the mandrel 11 after passing through the winding gap 10, then it enters the annular guide channel 17 which is outwardly limited by the rollers 22 rotating in the same direction. When the initial portion of the wafer strip contacts one of the rollers 22, it is frictionally entrained by the respective roller 22 in the rotation direction of the mandrel 11 and guided towards the mandrel 11.

Figure 4:
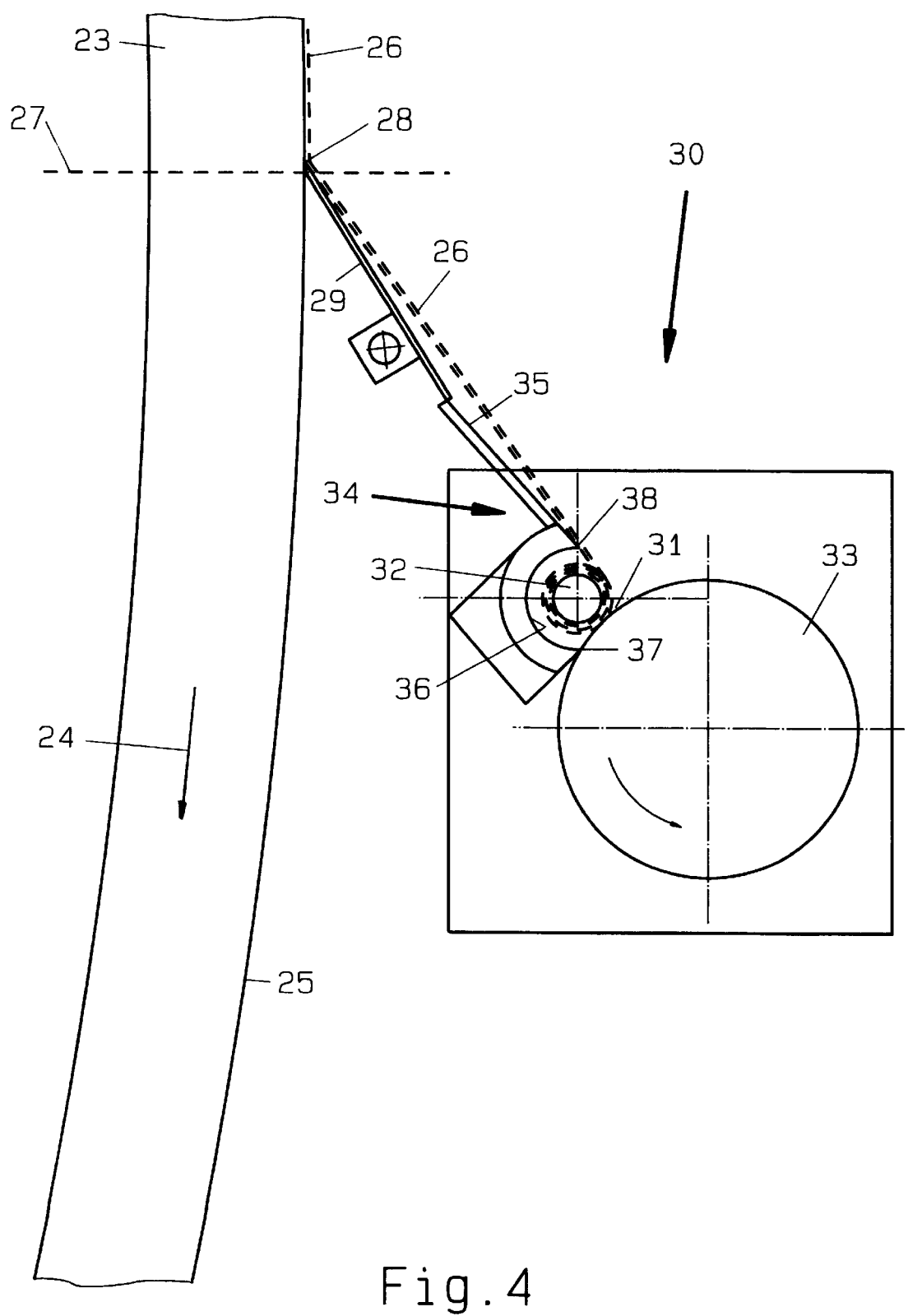
FIG. 4 is a schematic side view of the winding device corresponding to FIG. 1a with a fourth embodiment of an insertion device.

FIG. 4 shows a part of a baking machine for the continuous production of edible wafer rolls wherein a heated cylindrical baking drum 23 revolves continuously about a horizontal rotation axis in the direction of arrow 24. On the outer side of the baking drum 23, a revolving baking surface 25 is arranged, on which a wafer strip 26, plastically deformable when hot, is continuously baked. In the lateral area of the drum apex, the baked wafer strip 26 is removed from the hot baking surface, at a predetermined horizontal removal level 27, by the upper edge 28 parallel to the rotation axis of the baking drum 23 of a pivotable removal blade 29. The removed wafer strip 26 is directed towards winding device 30 located below the removal level 27, which comprises a winding gap 31 inclined with respect to the travel direction of the wafer strip 26. The gap is formed by a mandrel 32 rotating in the same direction as the baking drum 23 and a roller 33 parallel thereto, which in turn rotates in the opposite direction with respect to the rotation direction 24 of the baking drum 23 and in the opposite direction with respect to the rotation direction of the mandrel 32.

The winding device 30 comprises an insertion device 34 with a first threading member arranged upstream of the winding gap 31 and a second threading member arranged downstream of the winding gap 31. The first threading member is formed by a downwards sloping, flat guide surface 35 extending obliquely downwards from the lower edge of the removal blade 29 and ending above the mandrel 31. The second threading member is designed like a cylindrical guide surface 36 facing the mandrel 32, extending around the mandrel 32 from the surface of the roller 33 to the first threading member 35. The cylindrical guide surface 36, has a scraper edge 37.

In the starting phase of the production process of the wafer rolls, the initial portion of the baked wafer strip 26 is removed by the removal blade 29 from the revolving baking surface 25 and falls due to gravity over the removal blade 29 downwards onto the downwards sloping guide surface 35 and along the same down to its lower end 38. After leaving the guide surface, the initial portion of the wafer strip falls from above on the rotating mandrel 32 and is frictionally entrained by the same in its direction of rotation to the winding gap 31. In the winding gap 31, the initial portion of the wafer strip is frictionally entrained at its bottom side by the mandrel 32 and at its top side by the roller 33, clamped between mandrel 32 and roller 33 and pulled into the winding gap 31. Subsequently the segment of the wafer strip 26 extending from the upper edge 28 of the removal blade 29 to the winding gap 31 is tightened due to the start of the winding process, and is slightly lifted from the upper side of the removal blade 29 and from the downwards sloping guide surface 35.

After passing through the winding gap 31, the initial portion of the wafer strips adheres with its bottom side to the rotating mandrel 32 and is pressed with its upper side against the following segment of the wafer strip 26, and together with the same is transported again through the winding gap 31, thus starting the tubular hollow body.

If after passing the winding gap 31 the initial portion of the wafer strip does not adhere to the rotating mandrel 32, then the wafer strip 26 advanced by the two winding members 32, 33 pushes its initial portion against the cylindrical guide surface 36 and along the same around the mandrel 32, until the initial portion of the wafer strip encounters the bottom side of the segment of the wafer strip 26 following along the downwards sloping guide surface 35 and is frictionally entrained by the same and passed together with the same again through the winding gap 31, whereby in this case also the production of the tubular hollow body is started.

Figure 5:
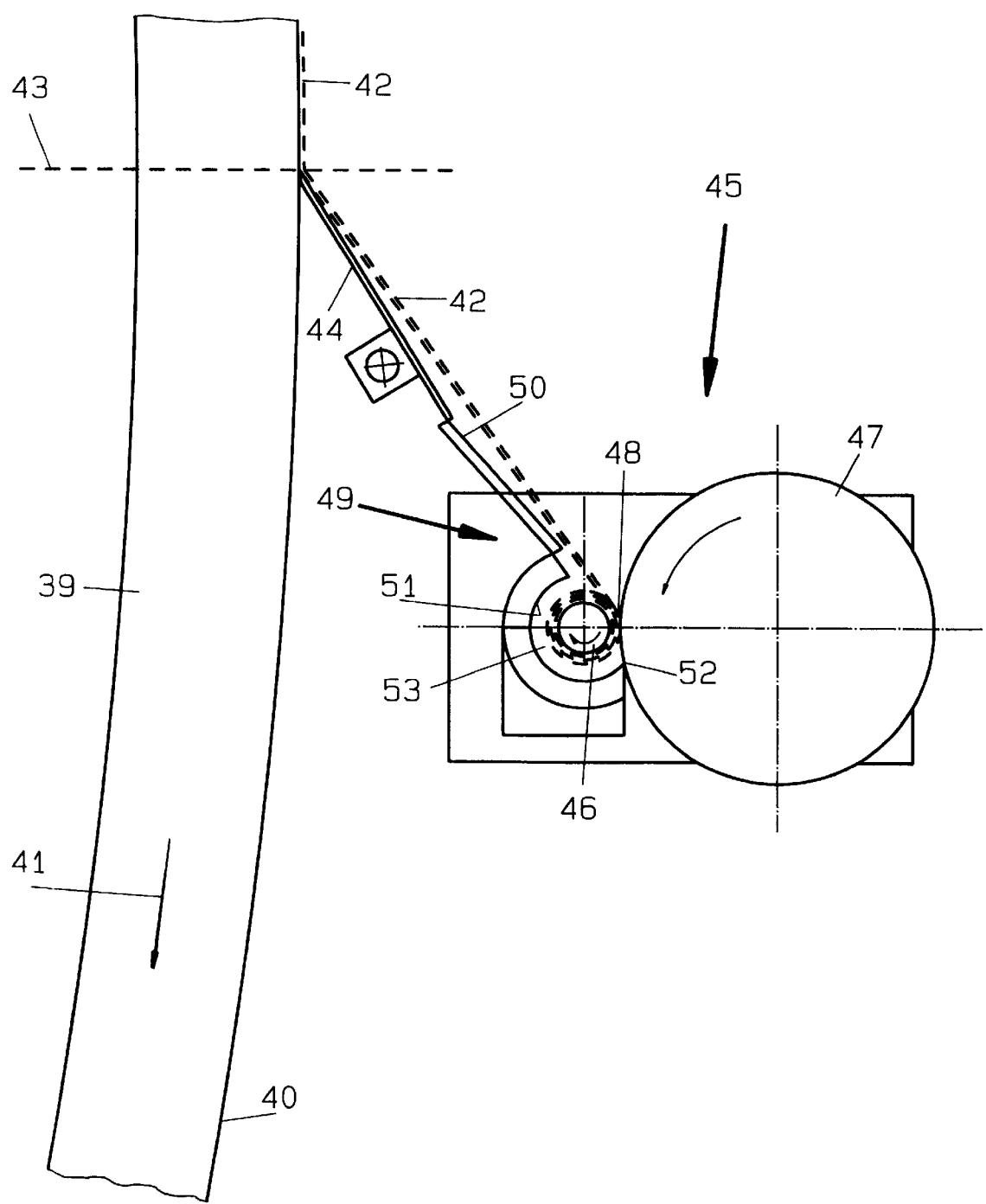
FIG. 5 shows in a schematic side view of the winding device corresponding to FIG. 1a with a fifth embodiment of the insertion device.

FIG. 5 shows a further embodiment of a baking machine with a baking drum 39 continuously revolving about a horizontal axis of rotation, on whose outer side a baking surface 40 is provided which runs with the baking drum 39 in the direction of arrow 41. On this baking surface 40, from a flowable wafer dough an endless wafer strip 42, plastically deformable when hot, is baked and, in the lateral area of the drum apex, is removed from baking surface 40 at a predetermined removal level 43 by means of a removal blade 44. In a winding device 45 between two winding members arranged one next to the other, designed as mandrel 46 and roller 47, the removed wafer strip is wound helically in overlapping turns on the mandrel 46 to form a tubular hollow body. The two winding members 46, 47 form a winding gap 48 inclined with respect to the travel direction of the wafer strip 42. The mandrel 46 rotates about its rotational axis in the same rotation direction as the baking drum 39. The roller 47 parallel to the mandrel 46 rotates about its axis of rotation in a direction opposite to the rotation direction 41 of the baking drum and the opposite direction of the mandrel 46.

The winding device 45 is provided with an insertion device 49, which comprises a first threading member arranged upstream of the winding gap 48 and a second threading member arranged downstream of the winding gap 48. The first threading member is designed as a flat guide surface 50 extending between the removal blade 44 and the lower-lying mandrel 46 and drops off obliquely downwards from the lower edge of the removal blade 44 towards the mandrel 46 and ends above the mandrel 46. The second threading member is designed as a cylindrical guide surface 51 which surrounds the mandrel 46 on its lower side and on its side facing away from the roller 47. The cylindrical guide surface 51 extends around the mandrel 46 up to the lower end of the flat guide surface 50. The margin 52 of the cylindrical guide surface 51 which is close to the roller 47 is designed as a stripping blade acting together with the roller 47.

In the starting phase of the production process for wafer rolls, the initial portion of the baked wafer strip 42 removed from the baking surface 40 by the removal blade 44 falls down due to gravity over the removal blade 44 onto the flat guide surface 50, and over that from above onto the rotating mandrel 46. The latter frictionally entrains the initial portion of the wafer strip in its rotation direction into the winding gap 48. There the initial portion of the wafer strip is frictionally seized on its bottom side by the mandrel 46 and on its top side by the roller 47, clamped between the mandrel 46 and the roller 47 and pulled into the winding gap 48 by these two winding members rotating in opposite directions. Subsequently the segment of the wafer strip 42 extending from the removal level 43 to the winding gap 48 is stretched and slightly lifted from the removal blade 44 and from the flat guide surface 50. If the initial portion of the wafer strip does not adhere to the mandrel 46, it is pushed forward in the rotation direction of the mandrel 46 in the annular guide channel 53 formed between the mandrel 46 and the cylindrical guide surface 51, until it meets the underside of the segment of the wafer strip 42 following along the flat guide surface 50. This wafer strip segment frictionally entrains the initial portion of the wafer strip and transports it again through the winding gap 48, whereby the production of the tubular hollow body is started.

Figure 6:
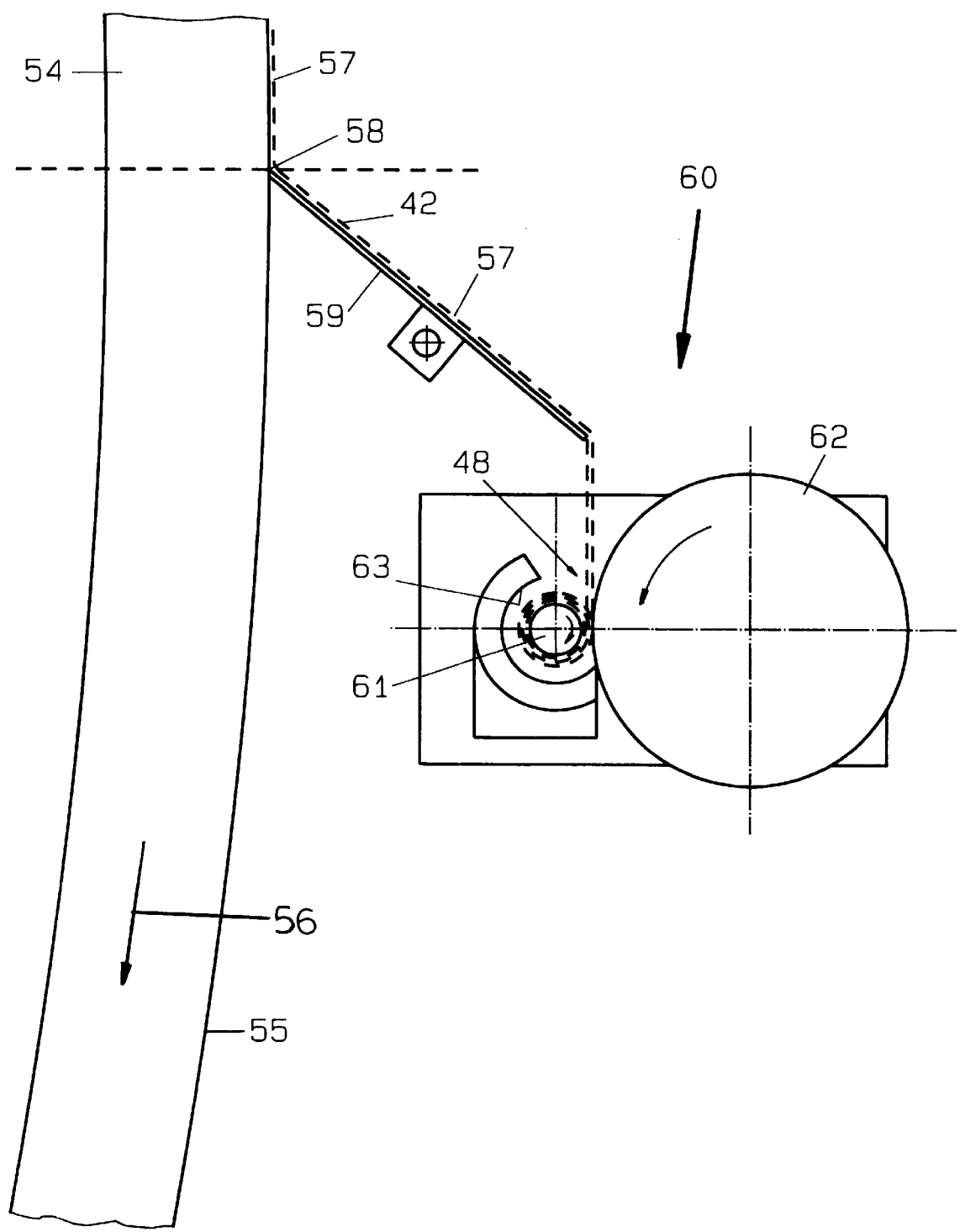
FIG. 6 is a schematic side view of a winding device corresponding to FIG. 1a with a sixth embodiment of the insertion device.

FIG. 6 shows a further embodiment of a baking machine with a baking drum 54 continuously revolving about a horizontal axis of rotation, on whose outer side a baking surface 55 is provided which rotates with the baking drum in the direction of the arrow 56. From flowable wafer dough an endless wafer strip 57, plastically deformable when hot, is continuously baked on this baking surface 55. In the lateral area of the drum apex, the wafer strip 57 is removed from the baking surface 55 at a predetermined removal level 58, by means of a removal blade 59 and directly guided by the same towards a winding device 60, wherein, between two winding members arranged next to each other and designed as a mandrel 61 and a roller 62, the wafer strip 57 is wound helically in overlapping turns to form a tubular hollow body. The two winding members 61, 62 form a winding gap 48, arranged below the removal blade 59 and inclined with respect to the travel path of the wafer strip 42. The mandrel 61 rotates about its axis of rotation in the same direction as the baking drum 54 revolves around its rotation axis. The roller 62 parallel to the mandrel 61 rotates about its rotation axis in a direction opposite to the rotation direction 56 of the baking drum 54 and in the opposite direction with respect to the rotation direction of the mandrel 61.

The winding device 60 is provided with an insertion device, which comprises a threading member arranged downstream of the winding gap and designed as a cylindrical guide surface 63, which surrounds the mandrel 61 on its underside and on its side facing away from the roller 62, and which at its margin close to the roller 62 is designed as a stripping blade acting together with the roller 62.

In the starting phase of the process for the production of wafer rolls, the initial portion of the wafer strip 57 removed from the baking surface 55 by the removal blade 59 falls by gravity over the removal blade 59 downwards, directly into the winding gap formed between the mandrel 61 and the roller 62. There the initial portion of the wafer strip is frictionally seized on its underside by the mandrel 61 and on its upper side by the roller 62 and wound about the mandrel 61. When prior to the formation of the first strip loop or strip coil the initial portion of the wafer strip wraps itself around the mandrel 61, either due to the plastic deformation of the wafer strip or to adhesion on the mandrel 61, the insertion device can be eliminated and the wafer strip 57 threads itself automatically into the winding gap and around the mandrel 61 in the winding device 60.

If the initial portion of the wafer strip does not wrap around the mandrel 61, then a single insertion device, having only one threading member arranged downstream of the winding gap is sufficient. In this case the initial portion of the wafer strip is pushed forward, between mandrel 61 and the cylindrical guide surface 63 of the threading member, in the rotation direction of the mandrel 61 around the mandrel 61, until it meets the underside of the segment of the wafer strip 57 following along the removal blade 59, and is frictionally entrained by the same and again passed through the winding gap, whereby in this case also the production process for the tubular hollow bodies is started.

Figure 7:
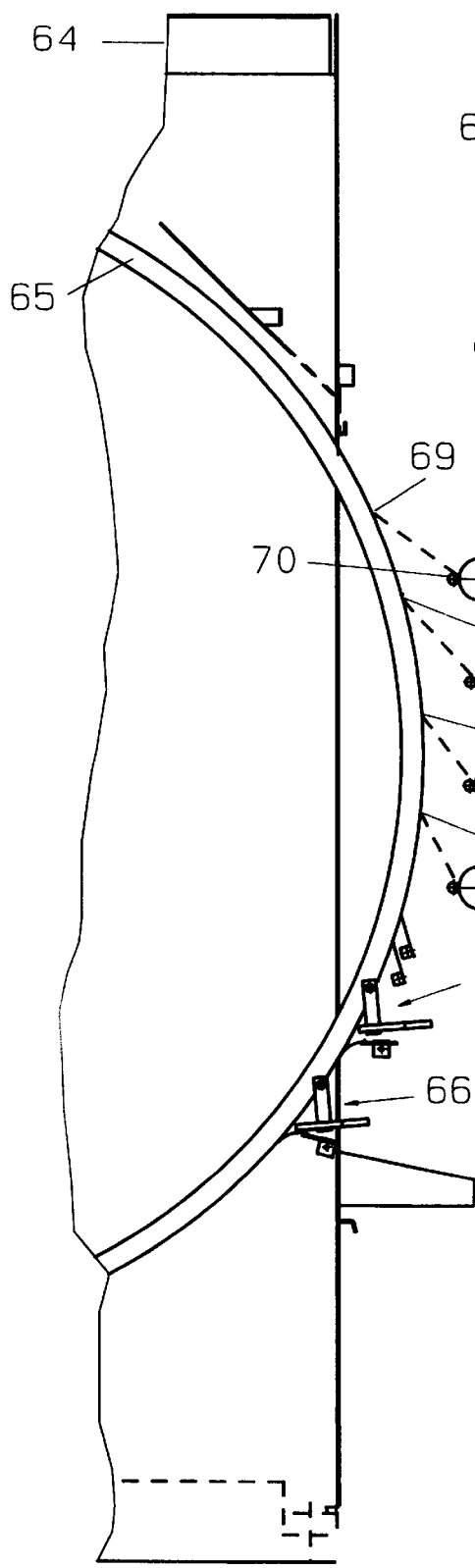
FIG. 7 is a side view which shows schematically a part of the processing station of a further embodiment of a baking machine, wherein on the outside of a heated baking drum four endless wafer strips are baked next to each other, which in the processing station are wound helically overlapping in four winding devices arranged on the outside of the baking drum, to form endless tubular hollow bodies.

FIG. 7 shows a baking machine 64 for the continuous production of edible wafer rolls with a baking drum 65 revolving about a horizontal axis, on whose outer side an endless, revolving baking surface is arranged, on which four endless wafer strips are simultaneously baked next to each other. The baking machine is provided with two devices 66 for applying the fluid wafer dough in four dough strips lying next to each other onto a downwards facing baking surface. The processing station 67 comprises four winding devices 68, each assigned to one baked wafer strip, which wind the respective wafer strip helically overlapping turns to form endless tubular hollow bodies. Each wafer strip is removed from the baking surface by a removal blade 69 parallel to the rotation axis of the baking drum and guided towards a winding device 68, wherein the two winding members forming the winding gap, mandrel 70 and roller 71, are arranged next to each other. Each winding device 68 comprises an insertion device not shown in the drawing, which corresponds substantially to the one in FIG. 5.

Figure 8:
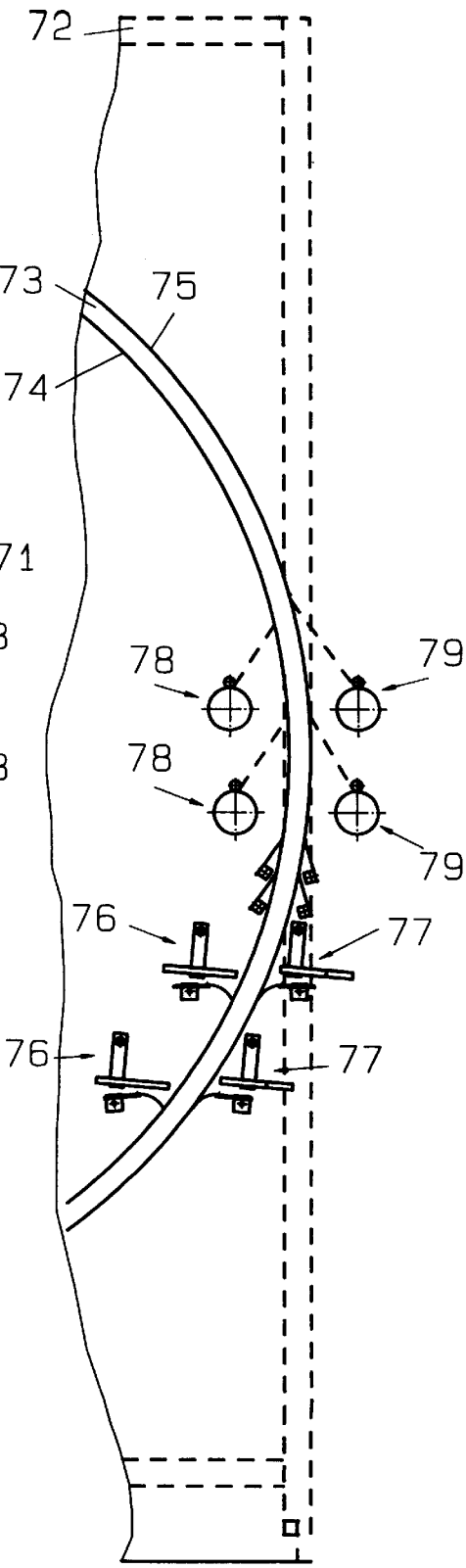
FIG. 8 is a similar view which shows schematically a part of a processing station of a baking machine, whose baking drum consist only of a cylindrical shell on whose outer side and inner side each two endless wafer strips are simultaneously baked next to each other, which are wound helically overlapping in winding devices of the processing station arranged inside, respectively outside the shell, to form an endless tubular hollow body.

FIG. 8 shows a baking machine 72 with a baking drum consisting only of a cylindrical shell 73 revolving about an imaginary horizontal axis, wherein on each of the inner side 74 and outer side 75 of the shell 73 an endless baking surface is arranged, on which respectively two endless wafer strips are simultaneously baked next to each other. For the two dough strips to be applied to the inner side 74 of the shell 73, inside the shell 73 two devices 76 are provided, each of them applying a dough strip of fluid wafer dough on an upwardly directed part of the inner side 74 of the shell 73. For the two dough strips to be applied to the outer side 75 of the shell 73, outside the shell 73 two devices 77 are provided, each applying a dough strip of fluid wafer dough on a downwards pointing part of the outer side 75 of the shell 73. In the processing station of the baking machine 72, two winding devices 78 or 79 are arranged inside as well as outside the shell 73, which wind the respective wafer strip removed from the inner side 74 of the shell 73, respectively from the outer side 75 of the shell 73, helically overlapping turns to form an endless tubular hollow body, which in the processing station is cut into equally long pieces forming the wafer rolls by a cutter not shown in the drawing. Each winding device 78 or 79, comprises an insertion device not represented in the drawing, which corresponds substantially to the one in FIG. 1.

What is claimed is:

1. A method for the continuous production of edible wafer rolls comprising the steps of:
   (a) baking an endless plastically deformable wafer strip from a flowable sugar containing wafer dough on a hot, endless, revolving baking surface;
   (b) removing an initial portion of said baked wafer strip from said hot baking surface at a predetermined removal level by a downwards sloping removal blade;
   (c) directing the removed initial portion of the baked wafer strip down by gravity to a winding gap arranged obliquely to a path of said wafer strip and defined by a continuously rotating winding mandrel and a second continuously counter-rotating winding roller;
   (d) grasping said initial wafer strip portion with at least one of said winding rollers and said mandrel;
   (e) guiding the grasped initial wafer strip portion around said winding mandrel towards a following wafer strip portion entering said winding gap;
   (f) pulling the grasped initial wafer strip portion together with said following wafer strip portion into said winding gap with said winding roller and mandrel;
   (g) winding said wafer strip about said winding mandrel in a helically overlapping relationship in successive turns to an endless, plastically deformable, tubular, hollow wafer body continuously moving along said rotating winding mandrel; and
   (h) cutting said hollow wafer body into wafer rolls of predetermined length assuming a crunchy, brittle consistency while cooling.

2. The method of claim 1 wherein said grasped initial wafer strip portion is guided around said winding mandrel towards said following wafer strip portion entering said winding gap by passing the grasped initial wafer strip portion through a stationary annular guide channel surrounding said winding mandrel.

3. A baking machine for continuously producing edible wafer rolls comprising:
   (a) an endless, revolving, hot baking surface for baking an endless plastically-deformable wafer strip from a fluid, sugar-containing wafer dough;
   (b) a removal device for removing said baked wafer strip from said hot baking surface at a predetermined removal level over a downwardly sloping removal blade;
   (c) an insertion device for automatically inserting a removed initial portion of said baked wafer strip into a following winding gap;
   (d) a winding device forming said winding gap and arranged obliquely to a path of said wafer strip and defined by a continuously rotating winding mandrel and a second continuously counter-rotating winding roller, said winding device winding said wafer strip around said winding mandrel in a helically overlapping relationship in successive turns to an endless, plastically deformable, tubular, hollow wafer body continuously moving along said rotating winding mandrel; and
   (e) a cutting device for cutting said tubular hollow wafer body into wafer rolls of predetermined length assuming a crunchy, brittle consistency while cooling.

4. The baking machine of claim 3 wherein said insertion device comprises a guide surface for said initial wafer strip portion, said guide surface being disposed upstream of said winding gap and sloping downwardly to it.

5. The baking machine of claim 3 wherein said insertion device comprises a guide downstream said winding gap for guiding said initial wafer strip portion leaving said winding gap around said winding mandrel towards a following wafer strip portion entering said winding gap.

6. The baking machine of claim 5 wherein said guide comprises an annular guide channel defined by a cylindrical guide surface spaced from said winding mandrel and surrounding it between said following wafer strip portion entering said winding gap and said second winding roller.

7. The baking machine of claim 6 wherein said cylindrical guide surface comprises a margin facing said second winding roller and forming a stripping blade for said initial wafer strip portion.

8. The baking machine of claim 5 wherein said guide means comprises a counter-rotating threading roller parallel to said winding mandrel for engagement with said initial wafer strip portion.

9. The baking machine of claim 8 wherein said guide means comprises several threading rollers counter-rotating with respect to said winding mandrel and arranged in an arc around it between said following wafer strip portion entering said winding gap and said second winding roller.

10. A winding device for the production of an endless, plastically-deformable, tubular, hollow wafer body from an endless, plastically deformable, baked wafer strip comprising:
    (a) a rotating winding mandrel on which said baked wafer strip is wound helically in overlapping turns to form a hollow wafer body moving along said rotating winding mandrel;
    (b) a counter-rotating winding roller pressing said baked wafer strip against said rotating winding mandrel during winding;
    (c) a winding gap defined by said rotating winding mandrel and said counter-rotating winding roller; and
    (d) an insertion device for automatically inserting the initial portion of said baked wafer strip into said winding gap.

11. The winding device of claim 10 wherein said insertion device comprises a guide surface for said initial wafer strip portion, said guide surface being disposed upstream of said winding gap and sloping downwards to it.

12. The winding device of claim 10 wherein said insertion device comprises a guide means downstream said winding gap for guiding said initial wafer strip portion leaving said winding gap around said winding mandrel towards the following wafer strip portion entering said winding gap.

13. The winding device of claim 12 wherein said guide means comprises an annular guide channel defined by a cylindrical guide surface spaced from said winding mandrel and surrounding it between said following wafer strip portion entering said winding gap and said second winding roller.

14. The winding device of claim 13 wherein said cylindrical guide surface comprises a margin facing said second winding roller and designed as a stripping blade for said initial wafer strip portion.

15. The winding device of claim 12 wherein said guide means comprises a parallel to said winding mandrel arranged container-rotating threading roller for said initial wafer strip portion.

16. The winding device of claim 15 wherein said guide means comprises several threading rollers counter-rotating with respect to said winding mandrel and arranged in an arc around it between said following wafer strip portion entering said winding gap and said second winding roller.

* * * * *